United States Patent [19]
Girauldon

[11] 3,712,423
[45] Jan. 23, 1973

[54] DISC BRAKE ANTI-RATTLE MEANS

[75] Inventor: Jean-Claude Girauldon, 77 Ponthierry, France

[73] Assignee: Societe Anonyme D.B.A.

[22] Filed: May 4, 1971

[21] Appl. No.: 140,073

[30] Foreign Application Priority Data

May 5, 1970 France.................................7016323

[52] U.S. Cl.................................................188/73.5
[51] Int. Cl.................................................F16d 65/00
[58] Field of Search..........................188/73.5, 205 A

[56] References Cited

UNITED STATES PATENTS

| 3,616,878 | 11/1971 | Girauldon | 188/73.5 |
| 3,545,576 | 12/1970 | Sahs | 188/73.5 |
| 1,820,721 | 8/1931 | Withrow | 188/205 A |
| 3,625,314 | 12/1971 | Rinker | 188/73.5 |

*Primary Examiner*—George E. A. Halvosa
*Attorney*—W. N. Antonis and Plante, Hartz, Smith and Thompson

[57] ABSTRACT

In a disc brake antirattle means interposed between the coacting surfaces of a pad and a fixed support which consist of a wire spring carried by the pad and having one hair pin shaped projection extending toward the adjacent anchoring surface of the fixed support, said projection being continued at both ends by wire loops, the free ends of which anchor on the edge of the backing plate of said pad, said loops extending in two parallel planes at such a distance from one another that said spring is clamped on said plate.

2 Claims, 2 Drawing Figures

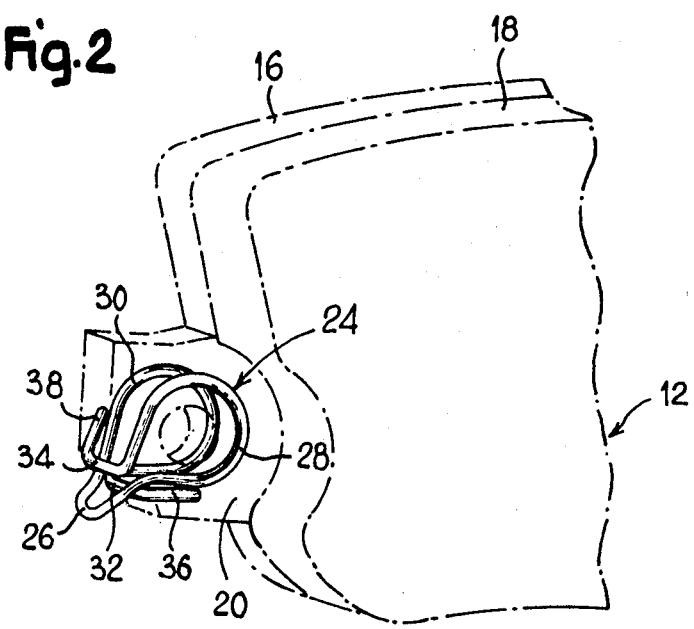
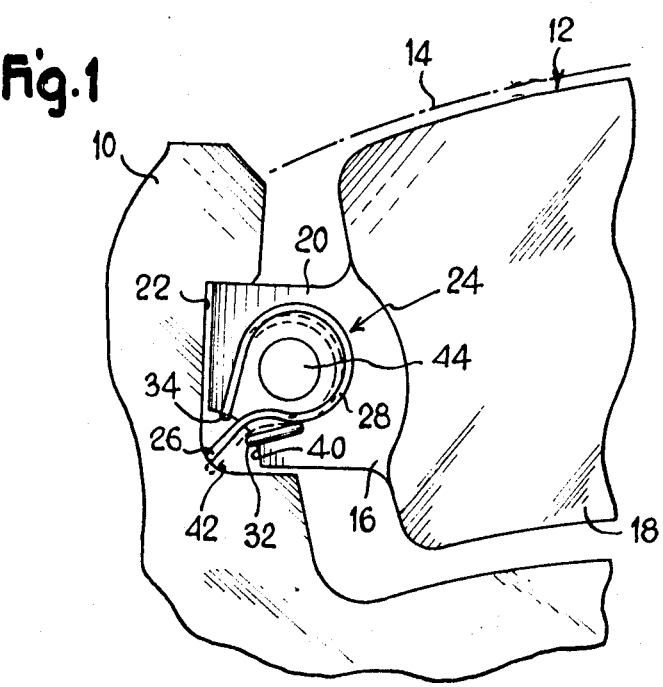

DISC BRAKE ANTI-RATTLE MEANS

This invention relates to disc brakes and more particularly to improvements therein providing efficient antirattle means.

The disc brake of the invention is of the type comprising a rotatable disc and a pair of friction pads arranged on the opposite sides thereof and slidably carried by a fixed support straddling the disc to be brought into engagement with the respective friction surfaces thereof, said friction pads and support having respective sets of coacting anchoring and abutment surfaces formed thereon for restraining said pads against both circumferential and radial displacements, resilient antirattle means being interposed between said coacting surfaces for limiting vibrational freedom of said pads in the plane of the disc.

It has already been proposed to use in a disc brake resilient tubular means consisting of metallic spring pins inserted into part cylindrical cavities of the fixed support which are made so as to break out into the anchoring surfaces thereof. Portions of said spring pins project from said cavities and are received in correspondingly shaped recesses of the respective abutment surfaces of the friction pad.

The metallic spring pins may consist of rolled sheet metal. Such spring pins do not keep secure in the aforesaid cavities and are liable to slide axially toward the disc under the action of vibrations. It is in fact very difficult to meet the tolerances in machining the cavities or recesses and in forming the spring pins with accuracy. Another drawback of the metallic slotted tubes constituting the spring pins resides in that they cause the formation of grooves in the surfaces of the disc. Furthermore, they are generally generating sonic vibrations at very high frequencies.

It has also been proposed in the applicant's Patent application in the U.S.A., U.S. Ser. No. 862,755, now U.S. Pat. No. 3,616,878, to avoid the above drawbacks by the provision of tubular members having at least at one end thereof a projection extending toward the associate pad parallely to the plane of the disc, to affix said tubing on a portion bare of lining of the backing plate of said pad. Said tubing has a length which is substantially equal to the thickness of the backing plate of the pad and lugs are provided at both ends of said tubing which are made of the same material as the latter and resiliently engage the opposite faces of said backing plate of the pad. The tubings and lugs are made of blade spring sheet metal and said tubing comprises a spirally formed portion connected to said lugs at its respective lateral ends and adapted to resiliently engage said anchoring and abutment surface of the fixed support.

The antirattle metallic resilient tubings are expensive to manufacture and they may lose their resiliency after a certain time of use on account of heating and fatigue. To avoid such drawbacks the present invention proposes an improved resilient antirattle means.

The disc brake of the kind described hereinabove is characterized in that the antirattle means consist of at least one wire spring carried by said friction pad and having one hair pin shaped projection extending toward the adjacent anchoring surface of the fixed support, said projection being continued at both ends by wire loops, the free ends of said loops anchoring on the edge of the backing plate of said pad assembly, said loops extending in two parallel planes at such a distance from one another that said spring is clamped on said plate.

According to another feature of the invention the free ends of said loops comprise a portion bent at right angles with respect to the portion of the loop engaging the plate to engage the edge of said plate.

The invention will now be described with reference to the accompanying drawings in which:

FIG. 1 is a partial view of a disc brake of the invention showing one anchoring end of a pad mounted in the fixed support of a disc brake with antirattle means inserted therebetween.

FIG. 2 is a perspective view of the end of the pad of FIG. 1 shown in phantom line with the wire spring shown in solid line.

In FIG. 1 there is shown a fixed support 10 of a known floating caliper disc brake such as the one described in Laverdant's U.S. Pat. No. 3,368,647, same Assignee, in which are slidably mounted two friction pad assemblies. The end portion of the one of the pads, pad 12, is to be seen on FIG. 1. A caliper (not shown) comprising at least one hydraulic motor straddles the pads to urge the latter against a disc 14, shown in phantom line.

Friction pad assembly 12 comprises a backing plate 16 carrying a lining block 18 bonded thereon. The backing plate 16 is bare of lining at its circumferentially spaced ends, only one of which, designated by reference 20, is shown in the drawing. The ends 20 are anchored in corresponding notches 22 provided in the fixed support 10 and facing one another. Gaps or clearances are provided radially and circumferentially between ends 20 and notches 22. In these gaps are inserted the antirattle springs of the invention. One of these springs, designated by the general reference 24, is represented in FIG. 1 which shows a side view of said spring (in solid line in its operative condition and in interrupted line in its free state).

The wire spring 24 has a hair-pin shaped projection 26 extending toward the adjacent surface of the notch 22. Projection 26 is continued at both ends by wire loops 28 and 30, the free ends of said loops 32 and 34 respectively are bent at right angles with respect to the planes of said loops to anchor on the peripheral edge of backing plate 16. The two loops 28 and 30 are substantially circular and lie in two parallel planes at a distance such that the wire spring 24 is clamped on plate 16. The two portions 32 and 34 bent at right angles are provided at their free ends with extensions 36 and 38 engaging the face of the plate 16 opposite to the one engaged by the corresponding loop 30 and 28 respectively.

In the shown embodiment, the backing plate 16 of pad 12 is provided with a quarter-round cutting 40 located in front of a rounded angle portion 42 of the fixed support. The hair-pin shaped projection 26 extends substantially in the bisector plane of cutting 40 and its outermost end is in abutment against the rounded surface 42 of the fixed support 10 to slide thereon when the pad assembly 12 is moved by the brake actuator toward the adjacent face of the disc 14.

It can be understood when considering FIG. 1 which shows in interrupted line the spring 24 in its free state that such spring acts to lift the pad toward the upper edge of notch 22 (as viewed on the drawing). Another spring 24 is also provided at the other circumferential end of pad 12 and acts in antagonism against the one shown in FIG. 1 and this provides a centering of the pad in the fixed support while providing a good antirattle action therebetween.

In FIG. 1, there has been shown a hole 44 drilled through the end 20 of pad 12 which is circumscribed by the loops 28 and 30. The loops do not interfere with this hole and it is possible to introduce therein the probe means of a wear indicating device.

What I claim is:

1. A disc brake comprising a rotatable disc and a pair of friction pads arranged on the opposite sides thereof and slidably carried by a fixed support straddling the disc for being brought into engagement with the respective faces of the disc, said fixed support and said friction pads having respective sets of coacting anchoring and abutment surfaces formed thereon for restraining said friction pads against both circumferential and radial displacement, resilient antirattle means being interposed between said coacting surfaces for limiting vibrational freedom of said friction pads in the plane of the disc, said antirattle means consisting of at least one wire spring carried by said friction pad and having one hairpin-shaped projection extending toward the adjacent anchoring surface of the fixed support, said projection being continued at both ends by wire loops, the free ends of said loops anchoring on the edge of the backing plate of said pad assembly and comprising a portion bent at right angles with respect to the portion of the loop engaging the plate to engage the end of said plate, said portions bent at right angles comprising at their free ends an extension engaging the face of the plate opposite to the one engaged by the corresponding loop, said loops extending in two parallel planes at such a distance from one another that said spring is clamped on said plate.

2. A disc brake as claimed in claim 1 wherein said spring is located with said hair pin shaped projection extending along the bisector plane of an apex angle of said plate made with a quarter round cutting engaged by said bent portions which extend symmetrically with respect to said bisector plane.

* * * * *